(12) United States Patent
Al-Khulaifi

(10) Patent No.: US 10,406,849 B1
(45) Date of Patent: Sep. 10, 2019

(54) TRAINING PEN FOR WRITING

(71) Applicant: Khaled A. M. A. A. Al-Khulaifi, Safat (KW)

(72) Inventor: Khaled A. M. A. A. Al-Khulaifi, Safat (KW)

( * ) Notice: Subject to any disclaimer, the term of this patent is extended or adjusted under 35 U.S.C. 154(b) by 0 days.

(21) Appl. No.: 16/269,803

(22) Filed: Feb. 7, 2019

(51) Int. Cl.
*G09B 11/02* (2006.01)
*B43K 24/02* (2006.01)
*B43K 29/00* (2006.01)
*G09B 11/00* (2006.01)

(52) U.S. Cl.
CPC ............ *B43K 24/023* (2013.01); *B43K 29/00* (2013.01); *G09B 11/00* (2013.01)

(58) Field of Classification Search
USPC .................................. 434/162–166; 401/6–8
See application file for complete search history.

(56) References Cited

U.S. PATENT DOCUMENTS

| | | | |
|---|---|---|---|
| 1,879,456 A | 9/1932 | Parsons | |
| 4,076,427 A | 2/1978 | Anderson | |
| 4,689,020 A * | 8/1987 | Rusk .................. | G09B 11/02 264/299 |
| 5,310,345 A * | 5/1994 | Gershon ............. | G09B 11/02 15/443 |
| 6,146,038 A | 11/2000 | Mittersinker et al. | |
| 6,461,067 B1 | 10/2002 | Beck et al. | |
| 6,554,516 B1 | 4/2003 | Christopher | |
| 6,773,183 B2 | 8/2004 | Geddes et al. | |
| 7,128,484 B2 * | 10/2006 | Schulken ............ | B43K 23/004 401/6 |
| 7,367,735 B2 * | 5/2008 | Kanari ................ | A45D 40/205 16/430 |
| 7,371,026 B2 * | 5/2008 | Berger ................ | G09B 11/02 401/8 |
| 7,540,679 B2 * | 6/2009 | Fukui ................. | B25G 1/00 401/6 |
| 7,794,163 B2 * | 9/2010 | Bush, III ............ | B43K 23/004 15/443 |
| 7,883,754 B2 | 2/2011 | Qiu et al. | |

(Continued)

FOREIGN PATENT DOCUMENTS

JP          3935411 B2       6/2007

OTHER PUBLICATIONS

"Training Pencil Grips," OTC Direct, Inc. website: https://www.orientaltrading.com/training-pencil-grips-a2-13606354.fltr.

(Continued)

*Primary Examiner* — Kurt Fernstrom
(74) *Attorney, Agent, or Firm* — Richard C. Litman

(57) ABSTRACT

A training pen for writing has a housing, a pen cap releasably attached to the housing, a retractable ink cartridge with a writing tip extending within an inner cavity of the housing and the cap, and three flexible, arcuate tabs extending from a lower end of the housing. The cap has six sides with side openings defined in alternating sides of the cap and a lower aperture defined at a lower end of the cap. The tabs extend through the side openings when not in use. A user can push the writing tip through the lower aperture by simultaneously depressing all of the tabs into grooves defined within the surface of the cap. Release of the tabs repositions the writing tip within the cap. Use of the pen can train a user io to properly grasp a writing utensil.

8 Claims, 5 Drawing Sheets

(56) References Cited

U.S. PATENT DOCUMENTS

| | | | | |
|---|---|---|---|---|
| 8,591,235 B1* | 11/2013 | Berman | ............... | G09B 11/02 |
| | | | | 434/166 |
| 9,304,610 B2* | 4/2016 | Case | ............... | G06F 1/182 |
| 2014/0267180 A1 | 9/2014 | Buelow et al. | | |
| 2015/0279229 A1* | 10/2015 | Padden | ............... | G09B 11/02 |
| | | | | 434/166 |
| 2016/0229219 A1 | 8/2016 | Pincus | | |

OTHER PUBLICATIONS

"The Pencil Grip Writing CLAW for Pencils and Utensils," Amazon website: https://www.amazon.com/dp/B004Y4HAAQ/ref=asc_df_B004Y4HAAQ5376898/?tag=hyprod-20&creative=394997&creativeASIN=B004Y4HAAQ&linkCode=df0&hvadid=198090265815&hvpos=1o14&hvnetw=g&hvrand=1373588890478332206&hvpone=hvptwo=&hvqmt=&hvdev=c&hvdvcmdl=&hvlocint=&hlocphy=9007569&hvtargid=pla-349131426169.

* cited by examiner

TRAINING PEN FOR WRITING

BACKGROUND

1. Field

The disclosure of the present patent application relates to handwriting, and particularly to a pen for teaching a user to properly grasp a writing instrument for writing by hand.

2. Description of the Related Art

A child generally has to practice holding a writing utensil for many years in order to develop appropriate handwriting skills. Conventional writing utensils do not promote the correct grasp or grip of the writing utensil, as they can be operated in any manner. While training devices which can help with writing skills do exist, these devises generally require a computer interface or other element in addition to the writing instrument itself.

Conventional writing utensils with tips that remain extended when not in use can also be dangerous for children. While conventional retractable pens have tips that can be retracted by pressing a button, these pens can still be dangerous if the user forgets to retract the tip.

Thus a training pen for writing solving the aforementioned problems is desired.

SUMMARY

A training pen for writing has a housing, a pen cap releasably attached to the housing, a retractable ink cartridge with a writing tip extending within an inner cavity of the housing and the cap, and three flexible tabs extending from a lower end of the housing. The cap has six sides with side openings defined in alternating sides of the cap and a lower aperture defined at a lower end of the cap. When the pen is not in use, the tabs extend through the side openings, forming an arc. A user can move the writing tip through the lower aperture by simultaneously depressing all of the tabs into grooves defined within the surface of the cap. Release of the tabs repositions the writing tip within the cap. Use of the pen can train a user to properly grasp a writing utensil.

These and other features of the present disclosure will become readily apparent upon further review of the following specification and drawings.

DETAILED DESCRIPTION OF THE PREFERRED EMBODIMENTS

Figure 1:
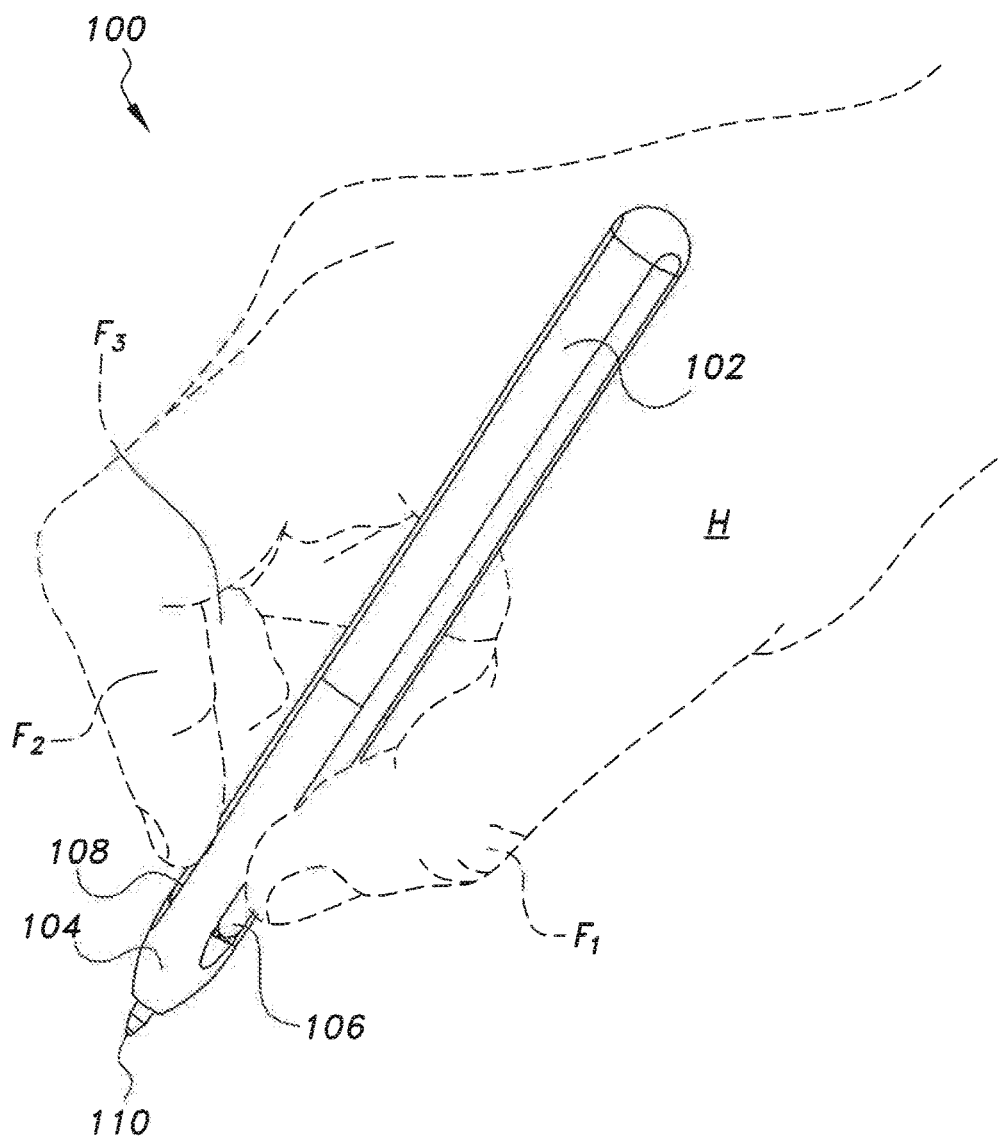
FIG. 1 is an environmental, perspective view of a training pen for writing, showing the pen being grasped by a user's hand.

A training pen for writing 100 is depicted in FIGS. 1-9, The pen 100 has a housing 102, a pen cap 104 releasably attached to the housing 102, a retractable universal-type ink cartridge 402 retained within an inner cavity 404 of the housing 102 and the cap 104, and three flexible tabs 106, 107 and 108 (FIG. 4) extending from a lower edge of the housing 102. The cartridge 402 includes an upper portion 412, an end portion 408, and a tip 110 extending from the end portion 408. The upper portion can have a diameter that is larger than a diameter of the end portion 408. The end portion 408 is connected to a lower end of each of the tabs 106, 107, and 108. In an embodiment, the cap 104 has six sides with side openings 426 defined in alternating sides of the cap 104 and a lower aperture 200 defined at a lower end of the cap 104. The tabs 106, 107, and 108 extend through the side openings 426 when the cap 104 is attached to the housing 104 and the pen 100 is not in use. In use, the tabs 106, 107, and 108 can be simultaneously depressed to lower the attached ink cartridge 402 and thereby move the tip 110 through the lower aperture 200 of the cap. When depressed, the tabs 106, 107, and 108 can be positioned within grooves 428 defined within the surface of the cap 104. Release of the tabs 106, 107, and 108 by the user positions the writing tip back within the cap 104. Use of the pen 100 can train a user to properly grasp a writing utensil.

Figure 2:
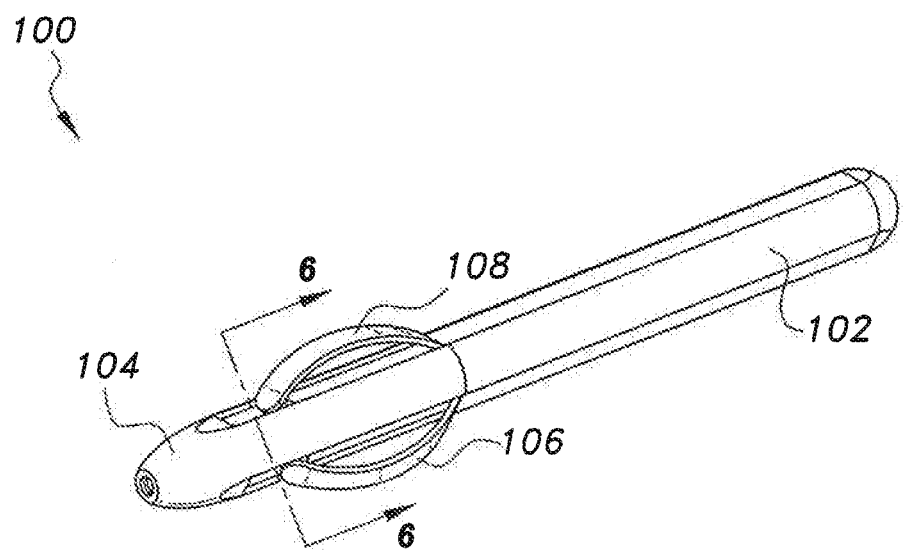
FIG. 2 is a perspective view of the training pen for writing of FIG. 1, with the tip of the pen in a retracted position.
Figure 3:
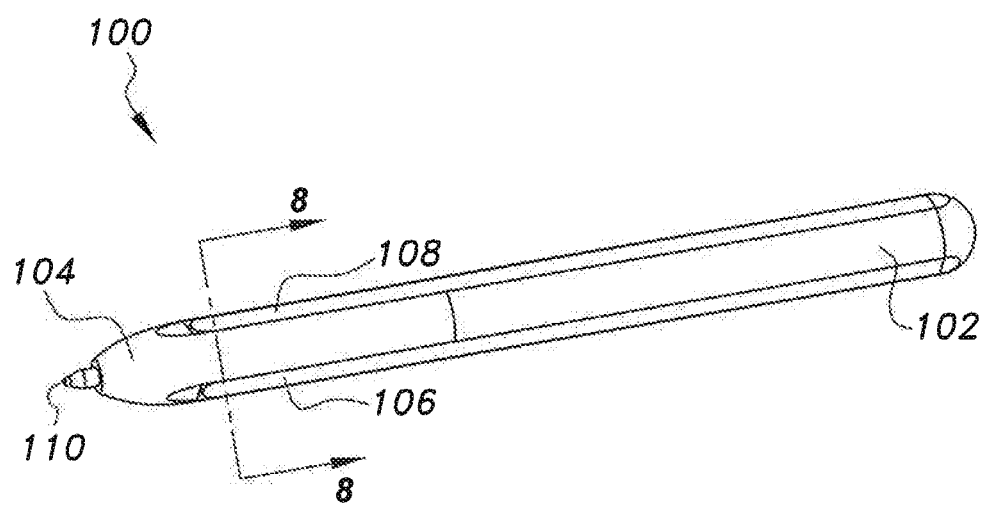
FIG. 3 is a perspective view of the training pen for writing of FIG. 1, with the tip of the pen in an extended position.

The training pen for writing 100 is shown in FIG. 1 being held by a user's hand H. A first finger (thumb) F1 can depress tab 106, a second finger (index finger) F2 can depress tab 108, and a third finger (middle finger) F3 can depress tab 107. When all three tabs 106, 107 and 108 are depressed simultaneously, the tip 110 of the pen is extended out of the lower aperture 200 in the cap 104. Release of the tabs 106, 107 and 108 causes the tip 110 to move back into the cap 104. FIG. 2 shows the pen 100 with the tip 110 of the pen in a retracted position. FIG. 3 shows the pen 100 with the tip 110 of the pen in an extended position.

Figure 4:
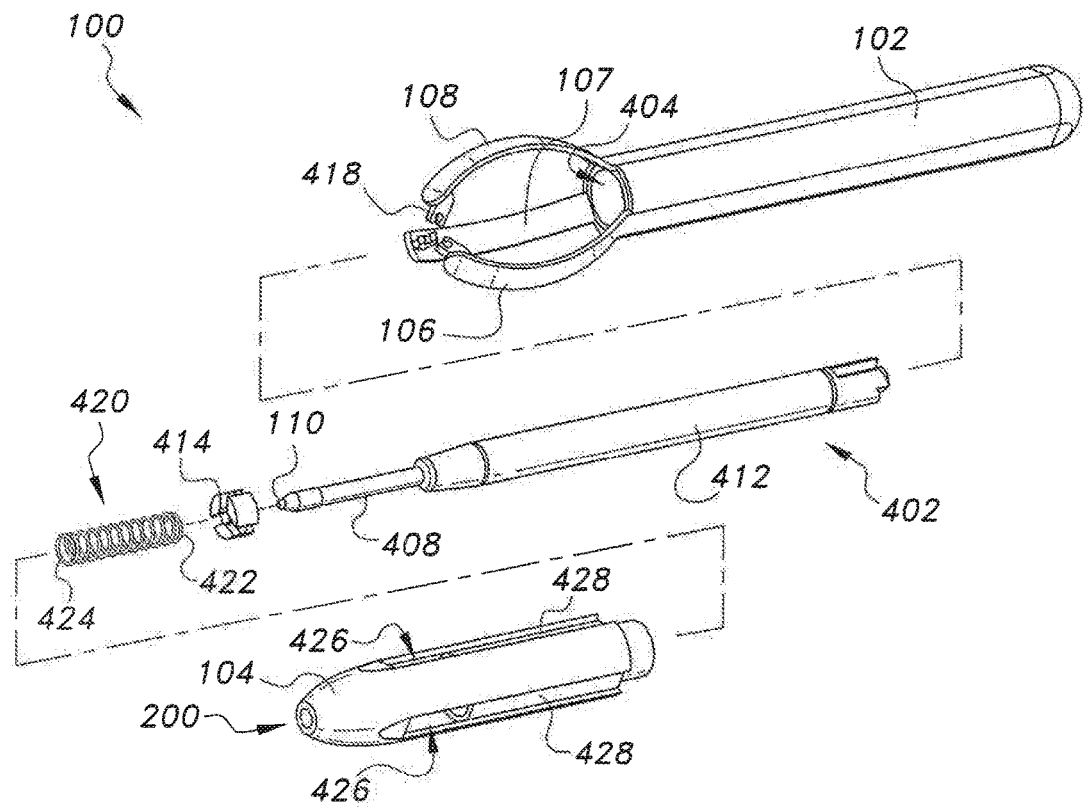
FIG. 4 is a perspective, exploded view of the training pen for writing of FIG. 1, showing the internal components thereof.

FIG. 4 is an exploded view of the pen 100, showing the internal components thereof. In an embodiment, the tabs 106, 107, and 108 include clip engaging members 418 at one end. The clip engaging members 418 can be attached to a clip 414 that is secured to the end portion 408 of the ink cartridge. The end portion 408 of the cartridge 402 is surrounded by a compression spring 420. The compression spring 420 can be connected to the lower end of the cap 104 at one end and to the clip 414 at another end.

Figure 5:
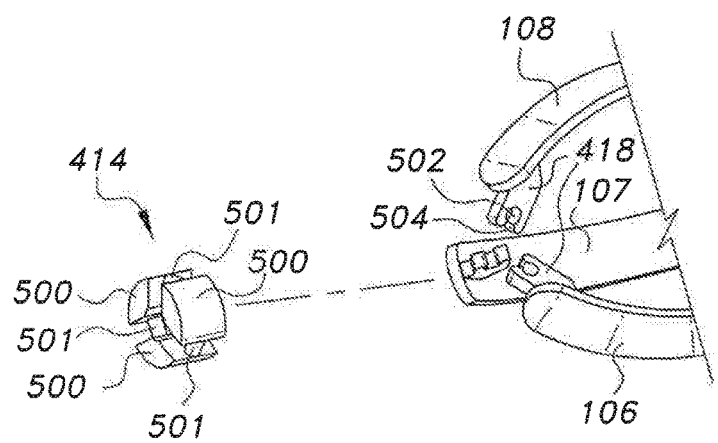
FIG. 5 is an enlarged, fragmented view of the clip of the training pen for writing FIG. 1.

FIG. 5 is an enlarged, fragmented view showing the clip engaging members 418 and the clip 414. The clip 414 includes three rods 501 that extend horizontally between three support brackets 500. The support brackets 500 grip the outer surface of the end portion 408. The rods 501 are spaced from the outer surface of the end portion 408. Each of the clip engaging members 418 includes a notch 504 and an adjacent through-hole 502. The rods 501 can be pressed through the notches 504 and positioned within the through-holes 502.

Figure 6:
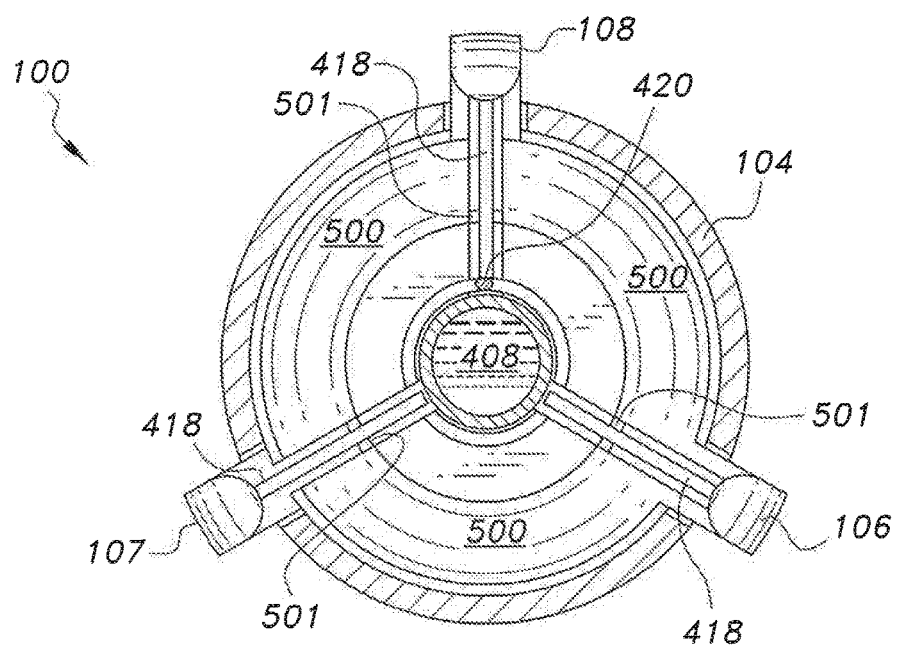
FIG. 6 is a cross-sectional view of the training pen for writing of FIG. 1, drawn along lines 6-6 of FIG. 2.
Figure 7:
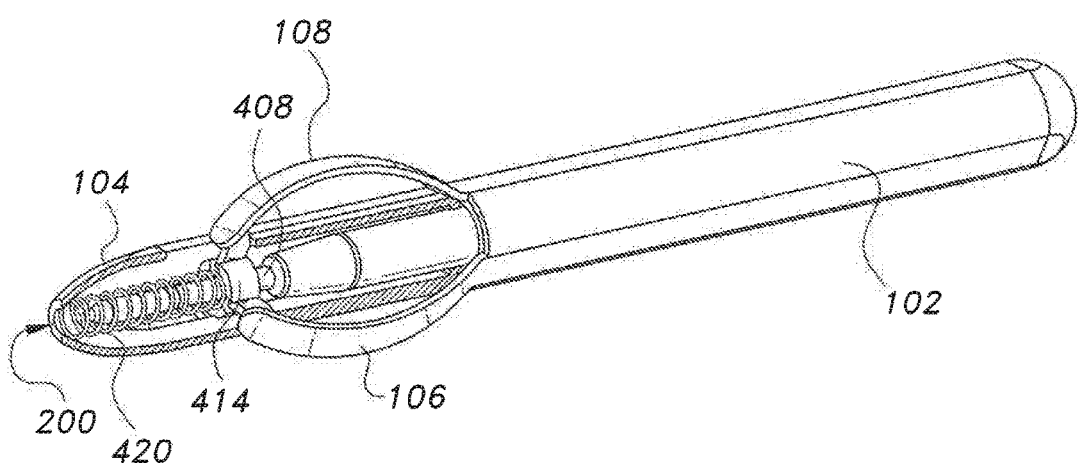
FIG. 7 is a perspective, fragmented view of the training pen for writing of FIG. 1, showing the internal components thereof, with the tip of the pen in a retracted position.

FIG. 6 is a cross-sectional view of the pen 100, drawn along lines 6-6 of FIG. 2, which is through the approximate center of the clip 414. When the tip 110 of the pen 100 is in the retracted position. FIG. 7 is a perspective, fragmented view of the pen 100 with the tip 110 of the pen 100 in the retracted position. in the retracted position, spring 420 remains in a relaxed, extended state.

Figure 8:
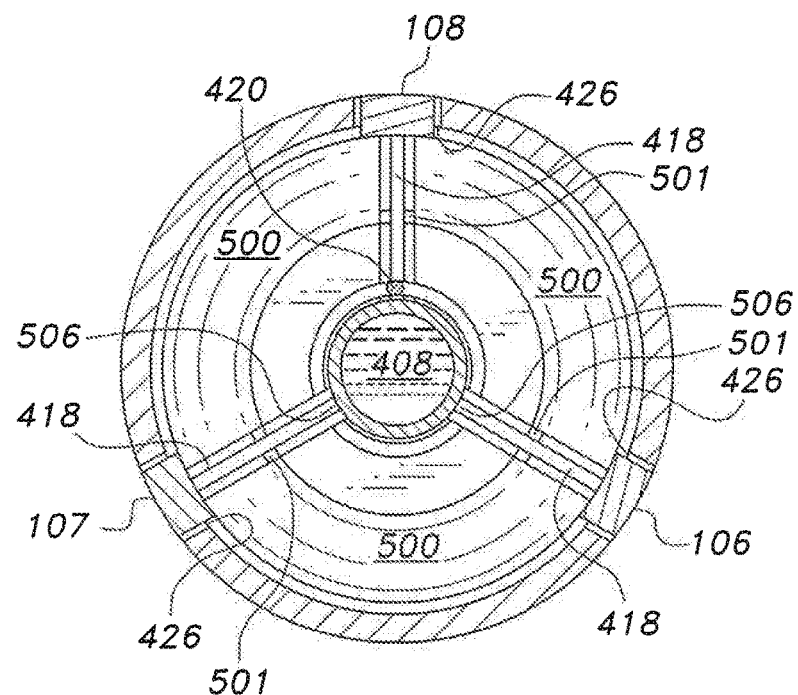
FIG. 8 is a cross-sectional view of the training pen for writing of FIG. 1, drawn along lines 8-8 of FIG. 3.
Figure 9:
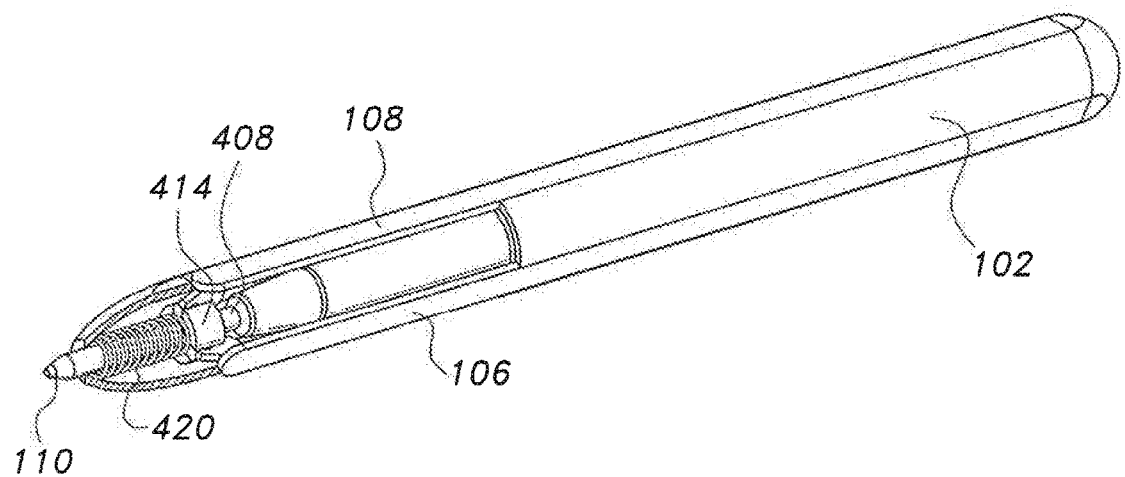
FIG. 9 is a fragmented view of the training pen for writing of FIG. 1, showing the internal components thereof, with the tip of the pen in an extended position, Similar reference characters denote corresponding features consistently throughout the attached drawings.

FIG. 8 is a cross-sectional view of the pen 100, drawn along lines 8-8 of FIG. 2, which is through the approximate center of the clip 414, when the tip 110 of the pen 100 is in the extended position. FIG. 9 is a perspective, fragmented view of the pen 100, with the tip 110 of the pen 100 in the extended position. As a user depresses the tabs 106, 107 and 108, the clip engaging members 418 push the clip 414 and attached end portion 408 forward, thereby compressing the spring and allowing the tip 110 to extend out of the housing. The user's grip on the tabs 106, 107, and 108 keeps the end portion 408 of the ink cartridge 402 lowered and retains the spring in a compressed state. Release of the tabs 106, 107, and 108 allows the spring to be extended, thereby raising the ink cartridge 402 and retracting the tip 110 back into the housing.

It is to be understood that the training pen for writing is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A training pen for writing, comprising:
   a housing having an open end, an opposed closed end, and an inner cavity extending between the open end and the closed end;
   a plurality of flexible tabs, each tab having opposed first and second ends, a first end of each tab being attached to a lower portion of the housing;
   a pen cap releasably attached to the lower portion of the housing, the pen cap having a lower aperture at a lower end thereof and a plurality of spaced side openings extending between the lower aperture and an upper end of the cap, the flexible tabs selectively extending through the side openings;
   a retractable ink cartridge extending within the housing and the cap and attached to the second end of each tab, the cartridge including a tip for writing; and
   a spring attached to the clip at one end.

2. The training pen for writing according to claim 1, wherein the cartridge includes a clip for attaching to the second end of each tab.

3. The training pen for writing according to claim 2, wherein:
   the second end of each tab includes a clip engagement member for attaching to the clip;
   the clip includes three spaced brackets and a rod extending horizontally between each pair of adjacent brackets, the brackets being secured to an outer surface of an end portion of the cartridge and the rods being spaced from the outer surface of the end portion; and
   the clip engaging members include a through-hole defined therethrough for receiving respective rods of the clip.

4. The training pen for writing according to claim 1, wherein the spring is a compression spring and surrounds an end portion of the ink cartridge.

5. The trailing pen for writing according to claim 1, wherein a diameter of the lower aperture of the cap is greater than a diameter of the writing tip.

6. The training pen for writing according to claim 1, wherein:
   the pen cap comprises a groove surrounding each of the side openings, the groove being configured to receive a peripheral edge of the tabs when the tabs are depressed.

7. The training pen for writing according to claim 1, wherein the plurality of side openings comprises three side openings and the plurality of tabs comprises three tabs.

8. The training pen for writing according to claim 6, wherein the pen cap comprises six sides and the side openings are defined in alternate ones of the sides.

* * * * *